United States Patent
Konishi et al.

(10) Patent No.: US 10,044,220 B2
(45) Date of Patent: Aug. 7, 2018

(54) UNINTERRUPTIBLE POWER-SUPPLY SYSTEM

(71) Applicant: Hitachi, Ltd., Tokyo (JP)

(72) Inventors: Yuichiro Konishi, Tokyo (JP); Atsuo Nishihara, Tokyo (JP); Keisuke Horiuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 552 days.

(21) Appl. No.: 14/702,936

(22) Filed: May 4, 2015

(65) Prior Publication Data
US 2016/0056667 A1 Feb. 25, 2016

(30) Foreign Application Priority Data

Aug. 22, 2014 (JP) .................. 2014-168960

(51) Int. Cl.
| | |
|---|---|
| *H02J 7/00* | (2006.01) |
| *H02J 9/00* | (2006.01) |
| *H02J 9/06* | (2006.01) |
| *H01F 37/00* | (2006.01) |

(52) U.S. Cl.
CPC ............ *H02J 9/062* (2013.01); *H01F 37/00* (2013.01)

(58) Field of Classification Search
CPC ................................ H02J 9/062; H01F 37/00
USPC .......................................................... 307/66
See application file for complete search history.

(56) References Cited

U.S. PATENT DOCUMENTS

| | | | | |
|---|---|---|---|---|
| 2011/0170322 | A1* | 7/2011 | Sato ................ | H02J 9/062 363/40 |
| 2012/0176088 | A1* | 7/2012 | Lee .................. | H02J 3/383 320/128 |
| 2014/0268896 | A1* | 9/2014 | Kurita .............. | H01F 37/00 363/17 |
| 2014/0292455 | A1* | 10/2014 | Kurita .............. | H01F 3/14 336/5 |
| 2015/0123479 | A1* | 5/2015 | Kurita .............. | H01F 37/00 307/66 |

FOREIGN PATENT DOCUMENTS

| | | |
|---|---|---|
| JP | 59-158511 A | 9/1984 |
| JP | 07-115773 A | 5/1995 |
| JP | 4951476 B2 | 3/2012 |

* cited by examiner

*Primary Examiner* — Rexford Barnie
*Assistant Examiner* — Toan Vu
(74) *Attorney, Agent, or Firm* — Mattingly & Malur, PC

(57) ABSTRACT

When the power is normally supplied from the commercial power supply, the storage battery is charged by reducing the DC voltage by the charge/discharge chopper. The switching unit is provided in the previous stage of the converter. When the commercial power supply is in an abnormal state, the three-phase AC converter is operated as three discharge choppers connected in parallel by supplying the power of the storage battery to the converter and boosting the power by the switching element included in the converter. The power of the storage battery is boosted by the charge/discharge chopper, and a part of the discharging power is supplied. One three-phase AC reactor is provided in the previous stage of the converter, and the three-phase AC reactor has three coils, magnetic leg iron cores having the coils winding around them, and one leg without a coil winding around it connected in parallel.

8 Claims, 18 Drawing Sheets

UNINTERRUPTIBLE POWER-SUPPLY SYSTEM

BACKGROUND OF THE INVENTION

1. Field of the Invention

The present invention relates to a uninterruptible power-supply system, and specifically to a uninterruptible power-supply system suitable for rectifying a three-phase AC by a converter including a power semiconductor module, converting the power into AC power of which the voltage and frequency can be changed by an inverter, and reducing a charging voltage of the storage battery or boosting a discharging voltage of the same.

2. Description of the Related Art

An uninterruptible power-supply system (referred to as UPS below) is an apparatus for using a power conversion apparatus to stably supply the power without an interruption of the power supply to a load when a commercial power supply and the like which is a stationary power supply has an abnormality. As IT use has been innovated in recent years, a demand of the UPS in a data center and the like has increased. Since the UPS for the data center is laid near cities where the land price is high, it is desired to reduce an installation area, that is, to miniaturize the apparatus.

The UPS is often used by using the storage battery as a voltage source when the commercial power supply and the like has an abnormality. The UPS discharges the storage battery and supplies the power to an inverter. Then, the UPS converts the power into a desired voltage and frequency and supplies it to a load. Conventionally, a chopper has a role for reducing a DC voltage rectified by the converter to charge the storage battery. The chopper also has a role for increasing a low-pressure storage battery voltage and supplying it to the inverter. The chopper is operated as a so-called bidirectional chopper (referred to as charge/discharge chopper below).

Generally, in the above-mentioned charge/discharge chopper circuit, an output power at the time of charge is small. However, it is necessary to have a rated power equivalent to that of the inverter at the time of discharge. Therefore, a switching element included in the charge/discharge chopper preferably has a rated current and rated loss capable of bearing a load at the time of discharge. Accordingly, when the commercial power supply is normally operated, a power semiconductor module included in the charge/discharge chopper and a reactor in a previous stage of the charge/discharge chopper have an excessive performance. The excessive performance increases the size of a charge/discharge circuit.

As a solution to a problem that the size of the charge/discharge circuit increases, for example, a system has been known in which an input connection destination of the converter is switched to the commercial power supply or the storage battery as described in JP 4951476 A. Specifically, at the time of commercial power supply abnormality, a rated DC voltage is output to the inverter by supplying the discharging power of the storage battery to the converter and the charge/discharge chopper which have performed a boosting operation. The structure described in JP 4951476 A can distribute the discharging power to the converter and the charge/discharge chopper. Therefore, miniaturization of the charge/discharge chopper itself and the reactor in the previous stage of the charge/discharge chopper can be realized.

SUMMARY OF THE INVENTION

It is necessary for the conventional UPS to have three reactors in the previous stage of the converter. In order to miniaturize and mount the three reactors, a three-phase AC reactor having a three-leg iron core is used. In a structure using the reactor having the three-leg iron core, a three-phase coil is formed by respectively winding coils around magnetic leg iron cores formed by laminating thin magnetic materials. Each magnetic leg iron cores is joined to a yoke iron core. When the commercial power supply is normally operated, a magnetic flux generated by an R-phase AC voltage is formed so as to pass through the yoke iron core and flow into S-phase and T-phase magnetic legs. The magnetic fluxes generated in the S-phase and T-phase are formed so as to flow into an R-phase via the yoke iron core. The direction of the magnetic flux in each phase is determined according to the direction of a current flowing in the coil, and a magnetic circuit is closed not to leak the magnetic flux.

However, when an instantaneous magnetic circuit of a case where the DC voltage is applied to the three phases of the three-phase AC reactor is described, the magnetic fluxes generated by DC energizing in each phase are formed so that a magnetic flux generated in an R-phase coil and magnetic fluxes generated in S-phase and T-phase coils flow to the same direction. Therefore, the magnetic fluxes concentrate in the yoke iron core on one side, and the magnetic fluxes become a leakage magnetic flux and form the magnetic circuit outside the structure. The leakage magnetic flux becomes a noise, and there is a possibility to cause a problem in that this causes a malfunction of a control apparatus and the like of the UPS.

A purpose of the present invention is to provide an uninterruptible power-supply system which can prevent a malfunction of an apparatus control by preventing a leakage magnetic flux in a magnetic circuit formed by storage battery discharge at the time of abnormality and reducing a noise.

To achieve the above purpose, in the present invention, an uninterruptible power-supply system includes a converter configured to receive a power from a three-phase AC power supply via a three-phase AC reactor and supply the power to a DC terminal by converting the power into a DC power, a capacitor configured to smooth the DC voltage supplied to the DC terminal, an inverter configured to convert the smoothed DC voltage into an AC voltage and supply the power to a load, and a charge/discharge chopper configured to reduce a voltage of the DC terminal and charge it to a storage battery or boost a voltage of the storage battery and discharge it to the DC terminal. When the three-phase AC power supply is in an abnormal state, the power from the storage battery is boosted by the charge/discharge chopper and supplied to the DC terminal, and the power from the storage battery is boosted by the converter and supplied to the DC terminal. The three-phase AC reactor includes three iron cores having three winding wires corresponding to the three phases and winding around them, a yoke iron core on one side connected to the three iron cores at one side, a yoke iron core on another side connected to the three iron cores on the another side, and a fourth iron core for connecting the yoke iron core on one side with each three iron cores.

Specifically, the uninterruptible power-supply system includes the converter for converting the power from the commercial power supply into DC, the capacitor for smoothing the DC voltage converted by the converter, and the inverter for converting the DC voltage converted by the converter into an AC voltage and supply the power to the load. When the power is normally supplied from the commercial power supply, the storage battery is charged by reducing the DC voltage converted by the converter by the charge/discharge chopper. The switching unit for supplying the power of the storage battery to the converter is provided in the previous stage of the converter. When the commercial power supply is in an abnormal state, the three-phase AC converter is operated as three discharge choppers connected in parallel by supplying the power of the storage battery to the converter and boosting the power of the storage battery by the switching element included in the converter. At the same time, the power of the storage battery is boosted by the charge/discharge chopper, and a part of the discharging power is supplied. At least one three-phase AC reactor is provided in the previous stage of the converter, and the three-phase AC reactor has three coils to which the DC current from the storage battery is distributed, magnetic leg iron cores having the coils winding around them, and at least one leg which does not have a coil winding around it. The coils, the magnetic leg iron cores, and at least one leg are connected in parallel (for example, five-leg iron core).

According to the present invention, when the DC voltage is applied to the three-phase AC reactor at the time of the storage battery discharge, the magnetic circuit is formed without leaking the magnetic flux in a reactor structure. Therefore, a malfunction of a control component and the like can be prevented.

DESCRIPTION OF THE PREFERRED EMBODIMENTS

Embodiments of the present invention will be described below with reference to the drawings.

First Embodiment

Figure 1:
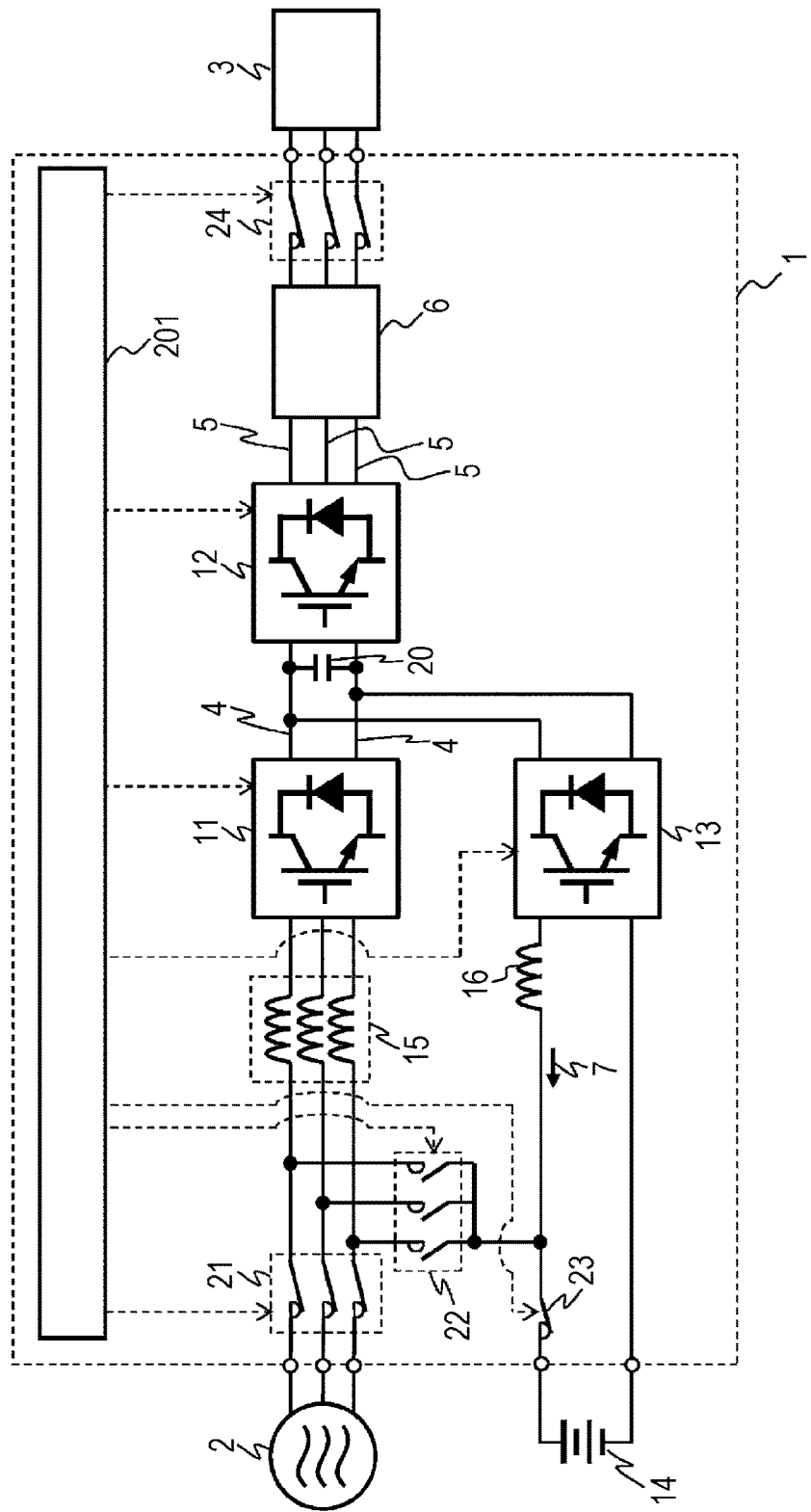
FIG. 1 is a diagram of a circuit structure of an UPS 1 according to a first embodiment when a commercial power supply is normally operated.

A first embodiment of the present invention will be described with reference to FIGS. 1 to 12. FIG. 1 is a simple circuit diagram of an UPS 1 of a case where a power is normally supplied from a commercial power supply 2. The present system is a double-conversion UPS system which can continue to supply the power without instantaneous interruption at the time of interruption of the power supply. A three-phase AC power from the commercial power supply 2 is supplied to a converter 11 via a stationary power-supply-side switch 21 and a three-phase AC reactor 15 having a five-leg iron core. Then, the three-phase AC power is converted from AC into DC by the converter 11 which is a rectifier circuit. The reactor 15 in a previous stage of the converter 11 is a part of a filter to remove a harmonic generated in a case where the converter 11 converts the power. After the rectification by the converter 11, a DC voltage 4 smoothed by a capacitor 20 is applied to an inverter 12 and reversely converted into AC of a desired voltage and frequency. After the reverse conversion, a harmonic component is removed by an output filter circuit 6 from a three-phase AC power 5 output by the inverter 12. After that, the three-phase AC power 5 is supplied to a load 3 via a load-side switch 24. In the double-conversion UPS system, the three-phase AC commercial power supply 2 constantly supplies the power to the load 3 via the converter 11 and the inverter 12. Therefore, a voltage fluctuation such as an instantaneous voltage drop occurs in the commercial power supply 2, the power equivalent to that of the normal commercial power supply can be stably supplied through the control by the converter 11 and the inverter 12. The operation of the converter 11 and the inverter 12 and ON/OFF of the stationary power-supply-side switch 21 and the load-side switch 24 are controlled by a signal from a host control circuit 201.

A previous stage of the inverter 12 is connected to a charge/discharge chopper 13. When the commercial power supply is normally operated, the charge/discharge chopper 13 performs a circuit operation as a step-down chopper for reducing the DC voltage 4 and outputting a charging power 7 to charge a storage battery 14. A storage battery protecting switch 23 has a role for protecting a battery from an overcurrent. The charge/discharge chopper 13 and the storage battery protecting switch 23 are controlled by the signal from the host control circuit 201.

Figure 2:
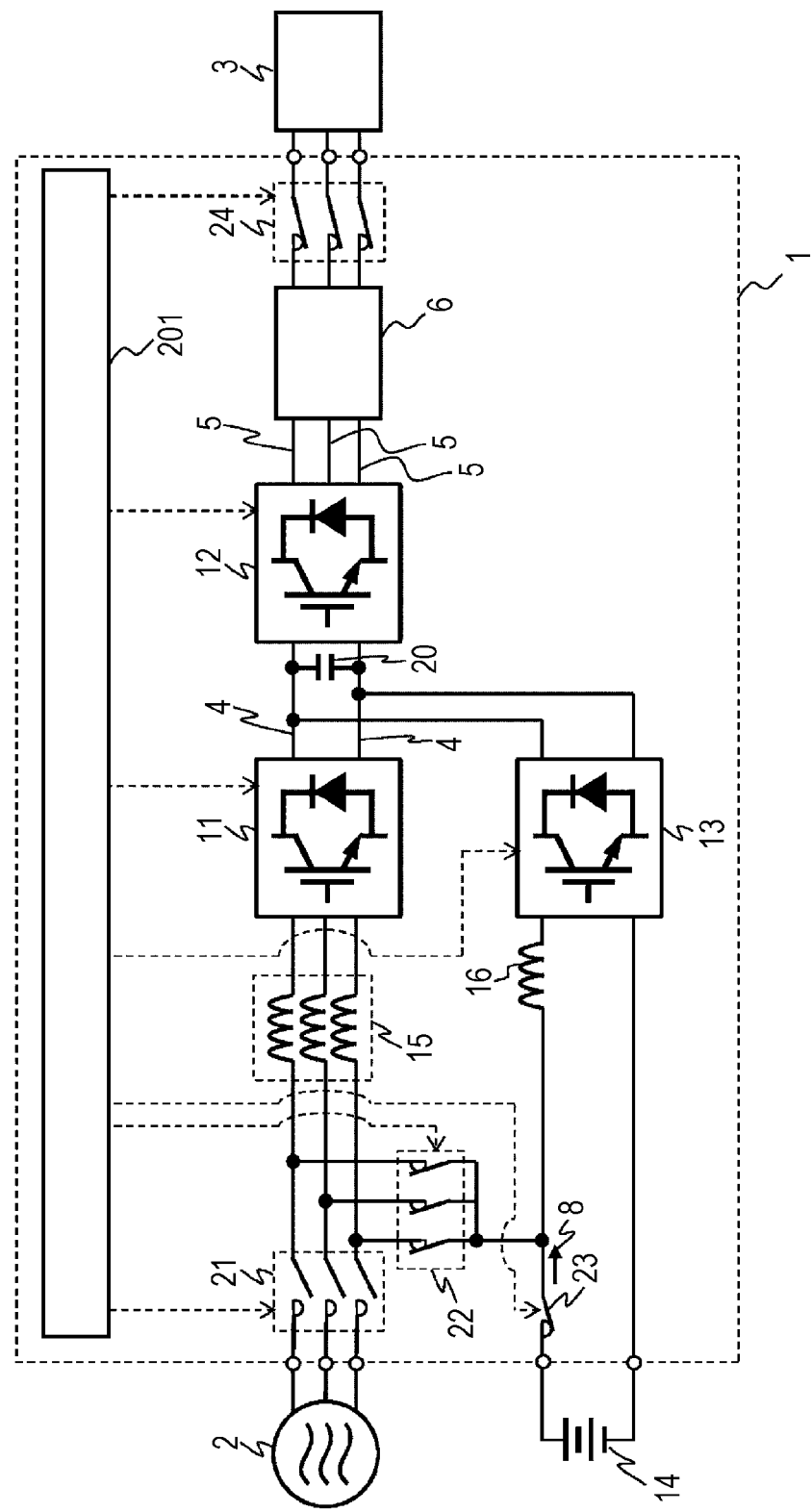
FIG. 2 is a diagram of a circuit structure of the UPS 1 according to the first embodiment when a commercial power supply abnormality occurs.

FIG. 2 is a diagram of a circuit connection of a case where the power cannot be supplied from the commercial power supply 2 (when an abnormality occurs). At the time of commercial power supply abnormality, a power supply source is switched from the commercial power supply 2 to the storage battery 14 by turning OFF the stationary power-supply-side switch 21 and turning ON the non-stationary power-supply-side switch 22. Accordingly, a circuit is configured in which a discharging power 8 of the storage battery 14 is distributed to a side of the converter 11 and a side of the charge/discharge chopper 13. In the present system, in order to miniaturize the UPS 1, a total voltage of the storage battery 14 is sufficiently lower than the DC voltage 4 to be applied to the inverter 12. Therefore, the charge/discharge chopper 13 also operates as a boosting chopper for boosting the DC voltage of the storage battery 14. The boosted DC power is supplied to the capacitor 20.

Also, at the time of the commercial power supply abnormality, the discharging power 8 is transmitted to the side of the converter 11 via the non-stationary power-supply-side switch 22, and the DC voltage is applied to the three-phase AC reactor 15 having the five-leg iron core. Since a rated voltage of the inverter 12 is output when the DC voltage is input to the converter 11, the converter 11 operates as the boosting chopper similarly to the charge/discharge chopper 13. At this time, the converter 11 and the charge/discharge chopper 13 are controlled by the signal from the host control circuit 201 so that boosting operations of them are synchronized with each other.

Figure 3:
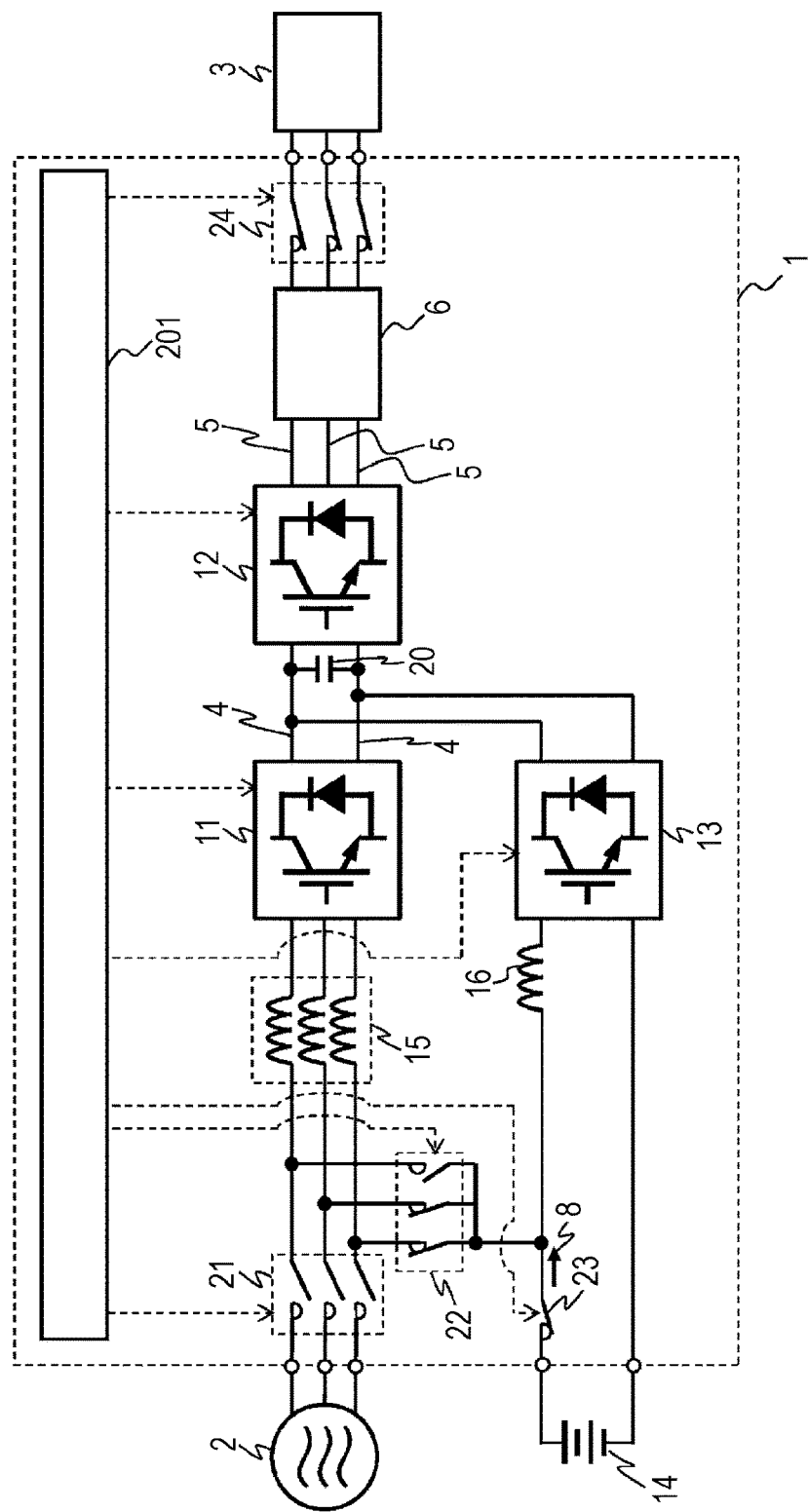
FIG. 3 is a simple circuit diagram of a case where one phase of three-phase wirings becomes unavailable in a converter 11 or a three-phase AC reactor 15 having a five-leg iron core when the commercial power supply abnormality occurs.

FIG. 3 is a simple circuit diagram of a case where one phase of the three-phase wirings becomes unavailable in the converter 11 or the three-phase AC reactor 15 having the five-leg iron core. By turning OFF a part of the non-stationary power-supply-side switch 22 connected to the phase which cannot, be used, the discharging power 8 can be supplied to the converter 11 via available wirings when the commercial power supply abnormality occurs. The same is applied to a case where two phases of the three-phase wirings become unavailable.

Figure 4:
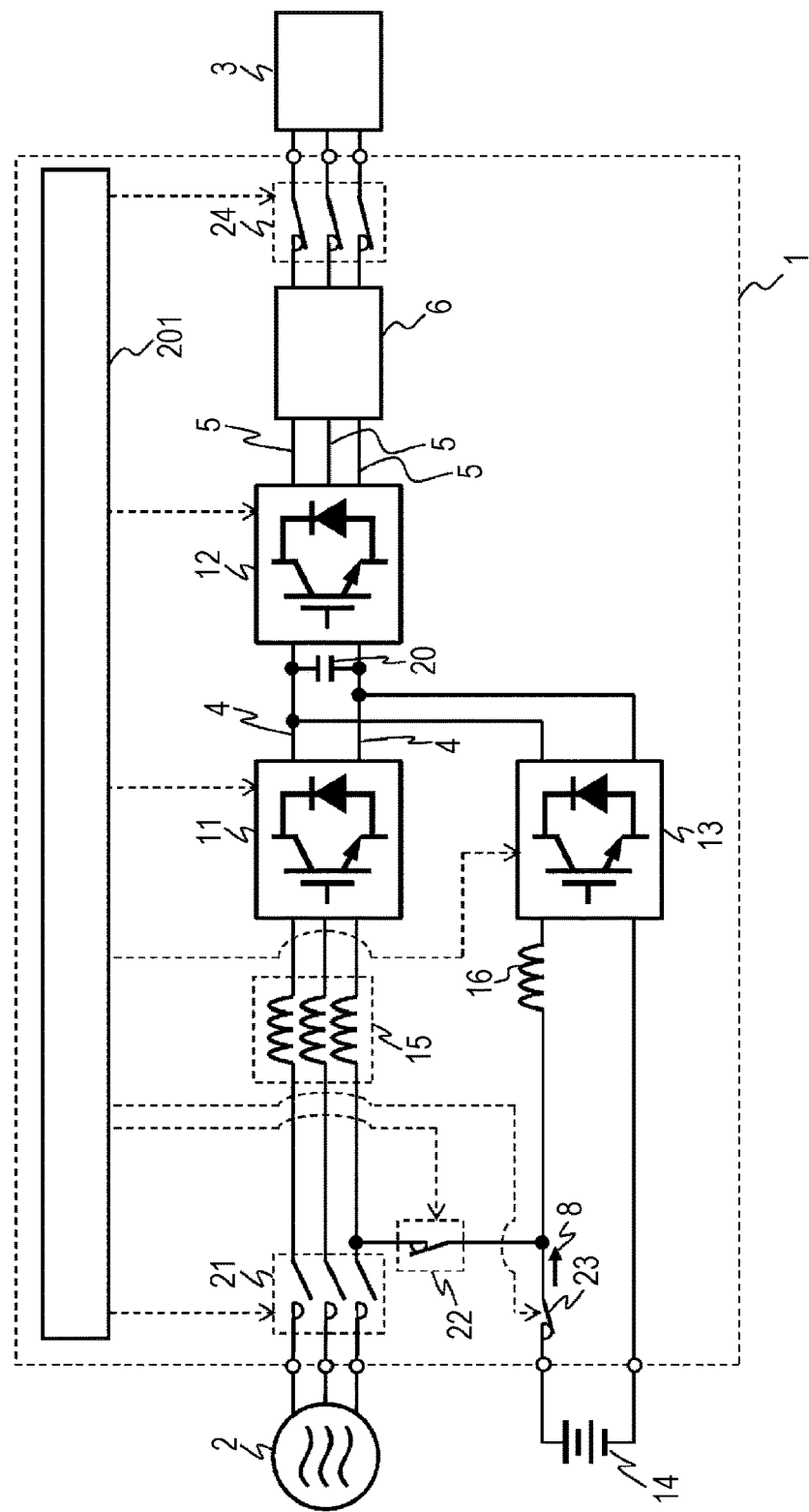
FIG. 4 is a simple circuit diagram of a case where a switching unit is provided so that one phase of a previous stage of the converter 11 becomes a storage battery discharge path.

Also, FIG. 4 is a simple circuit diagram of a case where a switching unit is provided so that one phase of a previous stage of the converter 11 becomes a storage battery discharge path. With this structure, the converter 11 and the charge/discharge chopper 13 can be used as two parallel boosting choppers at the time of the commercial power supply abnormality.

Figure 5:
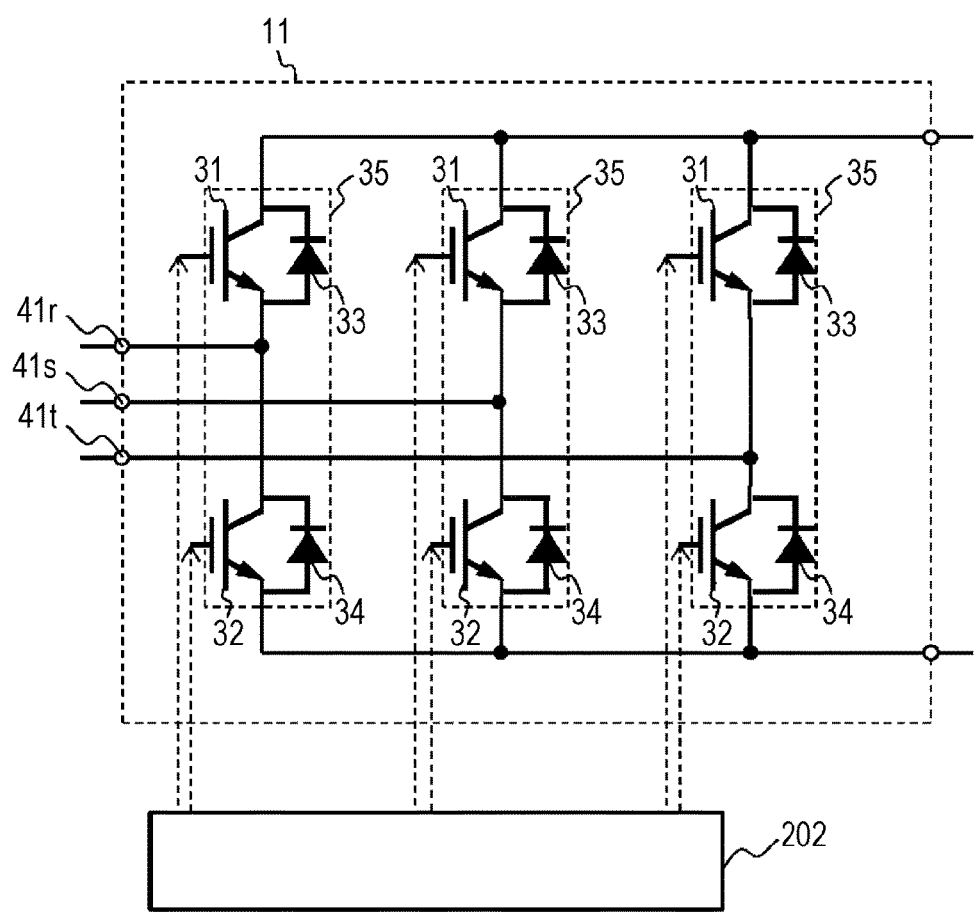
FIG. 5 is a circuit diagram of the converter 11 included in the UPS 1.

FIG. 5 is a circuit diagram of the converter 11 included in the UPS 1. The converter 11 converts a three-phase AC voltage of the commercial power supply 2 into the DC voltage 4. When the commercial power supply is normally operated, the three-phase AC power which is an input is supplied to AC terminals 41r, 41s, and 41t of the converter 11 and rectified by using switching elements 31 and rectifier elements 33 of an upper arm provided in the respective phases and switching elements 32 and rectifier elements 34 of a lower arm provided in the respective phases. In the present embodiment, an insulated gate bipolar transistor (IGBT) is used as the switching element, and a diode is used as the rectifier element. However, other kinds of elements can be applied without limiting to these (the same applies hereafter). The switching elements 31 and 32 of the converter 11 is driven by a signal from a control circuit 202. When an abnormality of the commercial power supply 2 occurs, the gates of the switching element 31 of the upper arm of R, S, and T phases are blocked while being turned OFF, and the switching elements 32 of the lower arm are driven an operated as a boosting circuit. At this time, it is preferable that the switching element 32 of the lower arm corresponding to the phase which has become conductive by the non-stationary power-supply-side switch 22 be driven.

Figure 6:
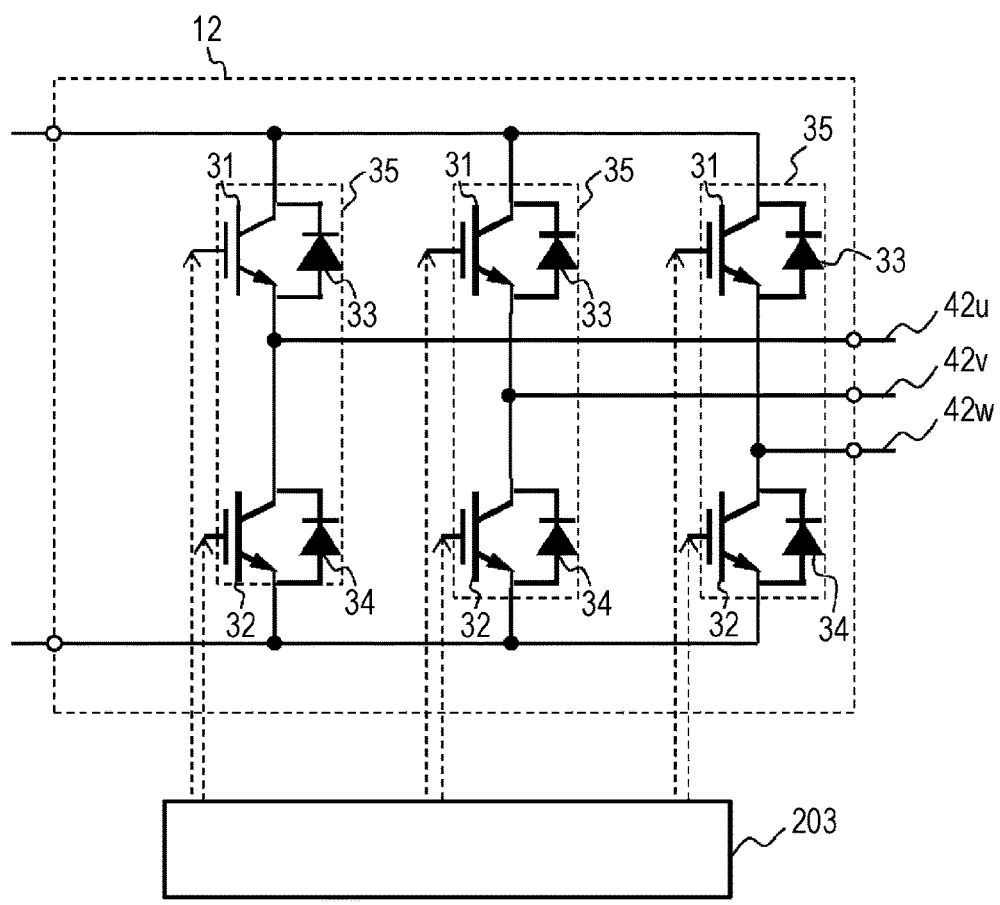
FIG. 6 is a circuit diagram of an inverter 12 included in the UPS 1.

FIG. 6 is a circuit diagram of the inverter 12 included in the UPS 1. The inverter 12 converts a DC power smoothed by the capacitor 20 into the three-phase AC power 5. The DC voltage 4 converted by the converter 11 is converted into the three-phase AC power 5 by using the switching elements 31 and the rectifier elements 33 of the upper arm provided in the respective phases and the switching elements 32 and the rectifier elements 34 of the lower arm and output to AC terminals 42u, 42v, and 42w. The switching elements 31 and 32 of the inverter 12 are driven by a signal from a control circuit 203. The inverter 12 converts the DC voltage into the AC voltage and outputs the rated power to the output filter circuit 6 regardless of the state of the commercial power supply 2.

Figure 7:
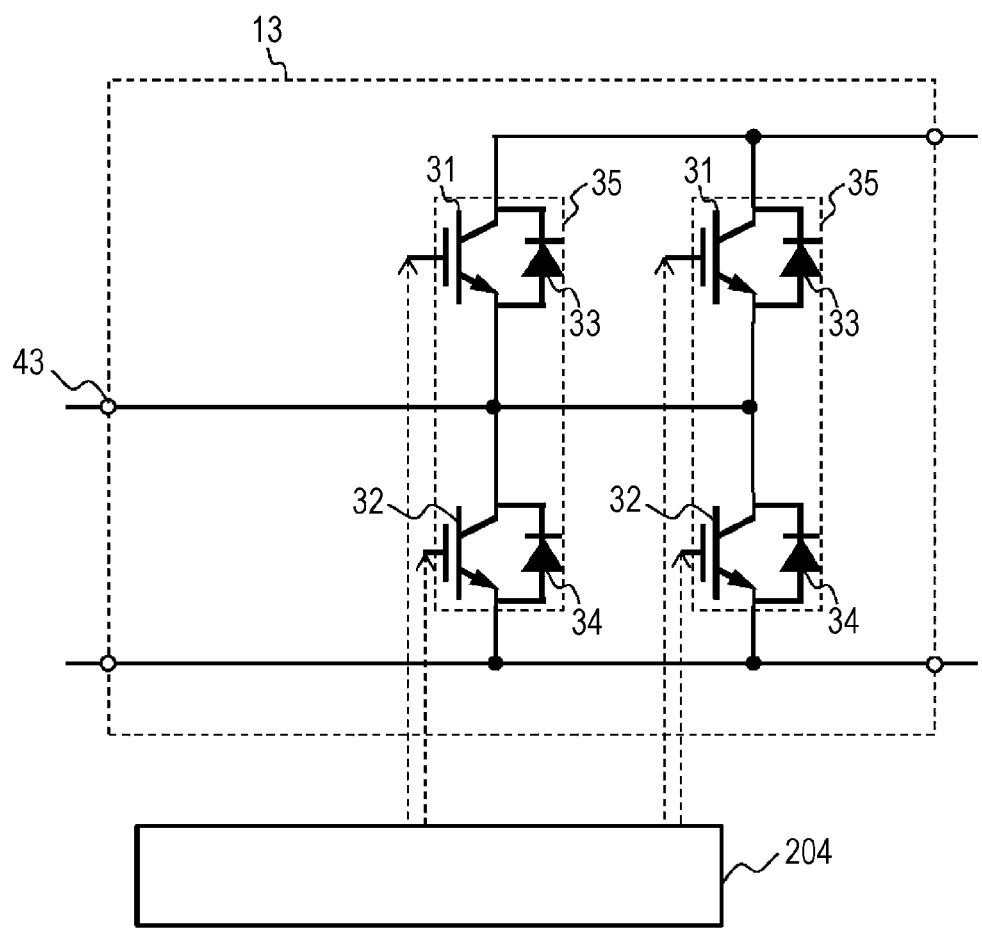
FIG. 7 is a circuit diagram of a charge/discharge chopper 13 included in the UPS 1.

FIG. 7 is a circuit diagram of the charge/discharge chopper 13 included in the UPS 1. The charge/discharge chopper 13 reduces the DC voltage 4 and outputs the charging power 7 when the commercial power supply 2 is normally operated. First, when the switching element 31 of the upper arm is turned ON, electromagnetic energy is accumulated in a reactor 16 connected between the storage battery 14 and the charge/discharge chopper 13. Next, when the switching element 31 of the upper arm is turned OFF, the electromagnetic energy in the reactor 16 in which counter electromotive force is generated is emitted, and then, the storage battery 14 is charged. On the other hand, at the time of the commercial power supply abnormality, the charge/discharge chopper 13 converts a low DC voltage of the storage battery 14 into a high DC voltage 4. First, the discharging power 8 of the storage battery 14 is supplied to the reactor 16. The electromagnetic energy is accumulated in the reactor 16 when the switching element 32 of the lower arm is turned ON. Next, when the switching element 32 of the lower arm is turned OFF, the rectifier element 33 of the upper arm is turned ON by the counter electromotive force of the reactor 16. Accordingly, a total voltage of the DC voltage of the storage battery 14 and a counter voltage of the reactor 16 appears at the output end of the charge/discharge chopper 13. As a result, the voltage is boosted. The switching elements 31 and 32 of the charge/discharge chopper 13 is driven by a signal from a control circuit 204. In the present embodiment, two two-level half bridge circuits 35 of the charge/discharge chopper 13 are connected in parallel. However, the number of the circuits connected in parallel is determined according to an amount of the power supply at the time when the power is discharged to the charge/discharge chopper 13. That is, the number of the charge/discharge choppers 13 connected in parallel can be reduced and the system can be miniaturized by operating the converters 11 as three boosting circuits connected in parallel at the time of the commercial power supply abnormality.

According to the above, the converter 11, the inverter 12, and the charge/discharge chopper 13 mounted in the UPS 1 of the present embodiment include the two-level half bridge circuit 35 as a basic structure. The two-level half bridge circuit 35 includes the switching element 31 and the rectifier element 33 of the upper arm and the switching element 32 and the rectifier element 34 of the lower arm connected in series. When the power supplied to the load 3 exceeds the rated power of the UPS 1, the rated power is increased by increasing the number of the two-level half bridge circuits 35 of the converter 11, the inverter 12, and the charge/discharge chopper 13 connected in parallel. In the present embodiment, since the converter 11 boosts the discharging power as three boosting circuits connected in parallel at the time of the commercial power supply abnormality, the increase in the number of the circuits connected in parallel in the charge/discharge chopper 13 is smaller than that of the converter 11 or the inverter 12.

Figure 8:
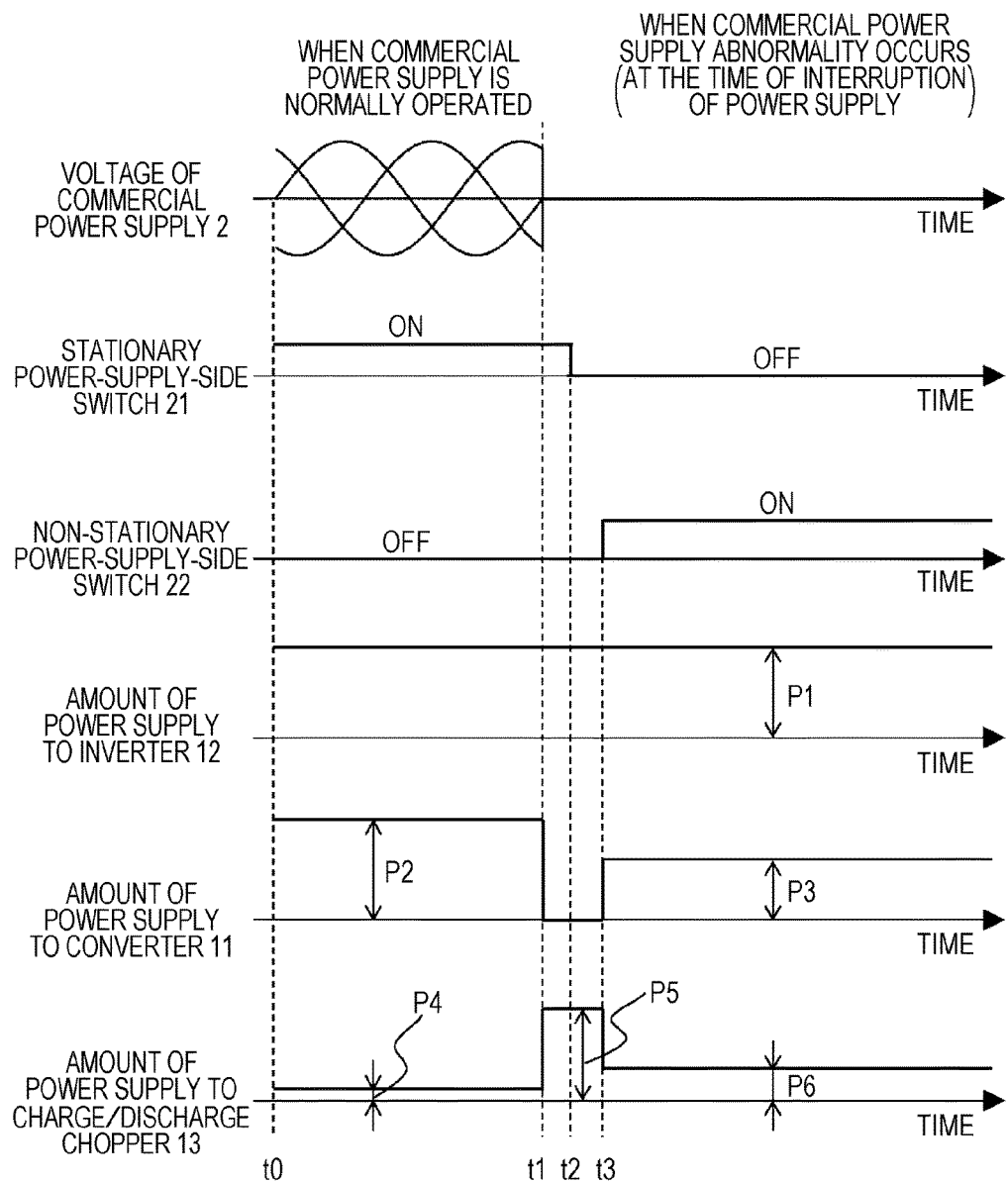
FIG. 8 is a waveform diagram of status of a commercial power supply voltage, switches 21 and 22, the converter 11, the inverter 12, and the charge/discharge chopper 13 when the commercial power supply abnormality occurs.

FIG. 8 is a waveform diagram of the commercial power supply voltage, the switches 21 and 22, the converter 11, the inverter 12, and the charge/discharge chopper 13 in the UPS 1. Time of t0 to t1 in FIG. 8 indicates a time when the commercial power supply is normally operated, and the time t1 and time after t1 indicate a time when the commercial power supply abnormality occurs. In the present embodiment, in order to miniaturize the system, the charge/discharge chopper 13 having a constant rating smaller than that of the inverter 12 is applied to the UPS 1. As a configuration example of the charge/discharge chopper 13, a charge/discharge chopper can be exemplified in which the number of the two-level half bridge circuit 35 is reduced from two to one in the circuit diagram in FIG. 7.

First, time of t0 to t1 in a case where the commercial power supply is normally operated will be described. When the commercial power supply is normally operated, the three-phase AC is input from the commercial power supply 2, and the stationary power-supply-side switch 21 is turned ON and the non-stationary power-supply-side switch 22 is turned OFF. The power of P2 is supplied from the commercial power supply 2 to the converter 11, and the power of P1 is supplied to the inverter 12. Also, a part of the power P4 rectified by the converter 11 is supplied to the charge/discharge chopper 13 to charge the storage battery. The relationship between the amounts of the power supply when the commercial power supply is normally operated is P1=P2−P4.

Next, time of t1 to t3 at the time of the commercial power supply abnormality will be described. First, the stationary power-supply-side switch 21 is turned OFF to prevent a short circuit to the commercial power supply 2 caused by the discharge of the storage battery. Time of t1 to t2 is necessary time to turn OFF the stationary power-supply-side switch 21. After it has been confirmed that the stationary power-supply-side switch 21 is turned OFF, the non-stationary power-supply-side switch 22 is turned ON. Time of t2 to t3 is necessary time to turn ON the non-stationary power-supply-side switch 22. Between the times t1 and t3, although the power supply to the converter 11 is interrupted, it is necessary for the UPS 1 to supply the power to the load 3 without instantaneous interruption. Therefore, the discharge of the storage battery is started in parallel to the ON/OFF operations of the switches 21 and 22, and the charge/discharge chopper 13 starts the boosting operation. The charge/discharge chopper 13 independently performs the boosting circuit operation between the times t1 and t3. However, since the charge/discharge chopper 13 has a smaller constant rating than that of the inverter 12, it is necessary to perform an overload operation for a short time. At the time of the overload operation, the DC power which receives the power of P5 and is boosted by the charge/discharge chopper 13 is supplied to the inverter 12. Therefore, the relationship between the amounts of the power supply of the time t1 to t3 is P1=P5.

Next, at and after the time t3 at the time of the commercial power supply abnormality will be described. When the non-stationary power-supply-side switch 22 is turned ON, the discharging power 8 of the storage battery 14 is distributed to the converter 11. The converter 11 performs a boosting circuit operation by sending a signal for abnormal condition from the control circuit 202 to the switching elements 31 and 32 included in the converter 11. At and after the time t3, the converter 11 and the charge/discharge chopper 13 become four boosting circuits connected in parallel of the storage battery 14. In the present embodiment, the converter 11 has a load of the power P3, and the amount of the power supply of the charge/discharge chopper 13 falls to P6 which is a constant rating at the abnormal condition. According to the rectifying function of the converter 11, it can be considered that the rated power is larger than that of the charge/discharge chopper 13. Even when the relationship between the amounts of the power supply is P3>P6, the converter 11 is sufficiently operated. The DC power boosted by the converter 11 and the charge/discharge chopper 13 is sent to the inverter 12, and the power is converted form DC to AC. After that, the power P1 is supplied to the load 3. The relationship between the amounts of the power supply at this time is P1=P3+P6.

Figure 9:
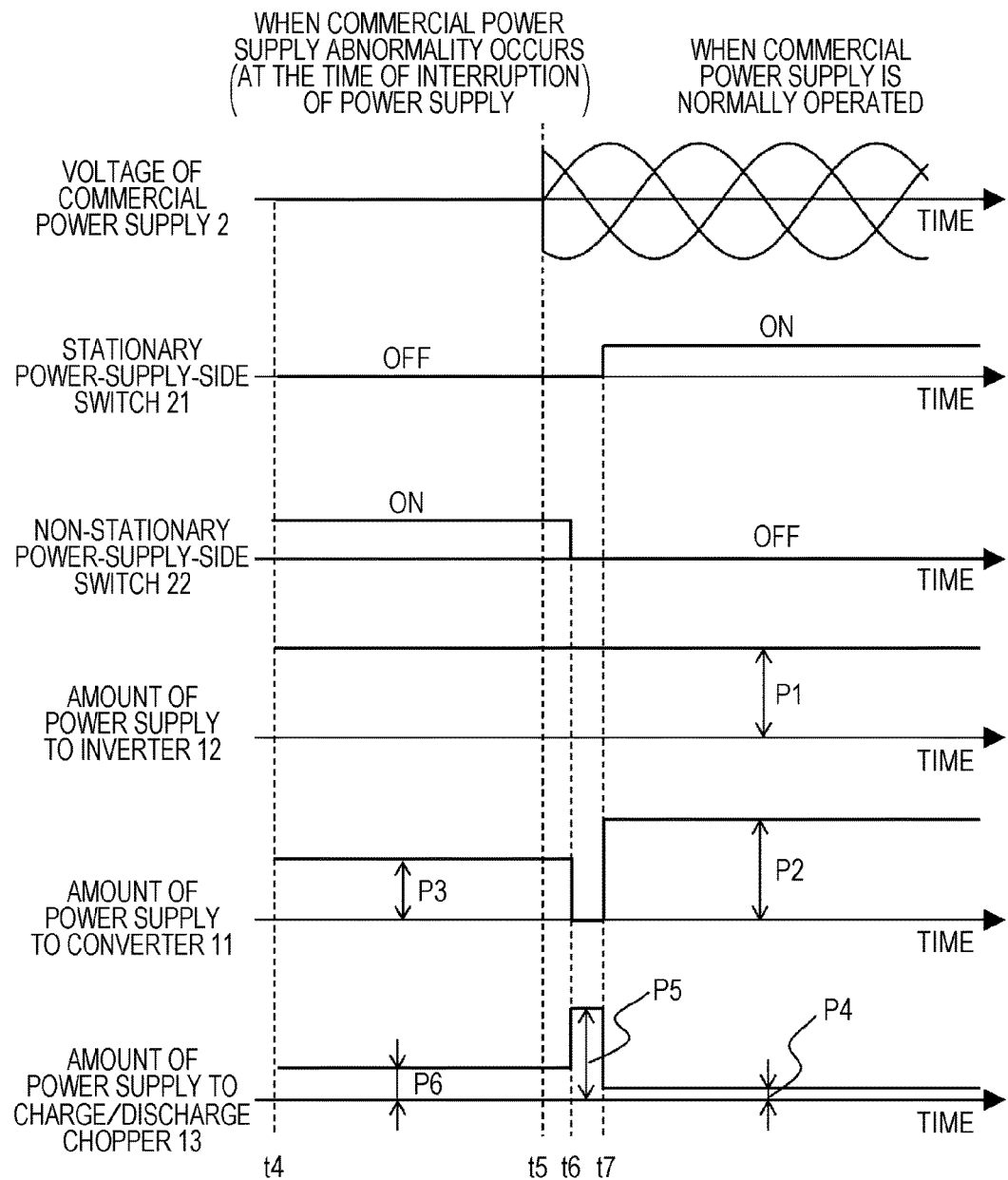
FIG. 9 is a waveform diagram of status of the commercial power supply voltage, the switches 21 and 22, the converter 11, the inverter 12, and the charge/discharge chopper 13 when the commercial power supply having an abnormality is restored to a normal state.

FIG. 9 is a waveform diagram of a case where the commercial power supply is restored from the abnormality state to the normal state. In FIG. 9, states of the commercial power supply voltage, the switches 21 and 22, the converter 11, the inverter 12, and the charge/discharge chopper 13 in the UPS 1 are illustrated. The time of t4 to t5 indicates a time when the commercial power supply abnormality occurs, and the time t5 and time after t5 when the commercial power supply is restored indicates a time when the commercial power supply is normally operated. A state of time t4 to t5 at the time of the commercial power supply abnormality is similar to that of the time t3 and after the time t3 in FIG. 8, and P3>P6 and P1=P3+P6 are satisfied.

The time of t5 when the commercial power supply is restored to the time t7 will be described. First, the non-stationary power-supply-side switch 22 is turned OFF to prevent the short circuit to the commercial power supply 2 caused by the discharge of the storage battery. Time of t5 to t6 is necessary time to turn OFF the non-stationary power-supply-side switch 22. After it has been confirmed that the non-stationary power-supply-side switch 22 is turned OFF, the stationary power-supply-side switch 21 is turned ON. Time of t6 to t7 is necessary time to turn ON the stationary power-supply-side switch 21. Between the times t6 and t7, although the power supply to the converter 11 is interrupted, it is necessary for the UPS 1 to supply the power to the load 3 without instantaneous interruption. Therefore, the charge/discharge chopper 13 becomes the overload operation from the time t6 to t7 and receives the power P5. The DC power boosted by the charge/discharge chopper 13 is supplied to the inverter 12 and converted into a desired voltage and frequency. After that, the converted power is supplied to the load 3. The relationship between the amounts of the power supply of the time t6 to t7 is P1=P5.

At and after the time t7 when the stationary power-supply-side switch 21 is turned ON, the UPS 1 performs the operation of a case where the commercial power supply is normally operated. When the commercial power supply is normally operated, the converter 11 performs the rectifier circuit operation and converts the AC power of the commercial power supply into the DC power. Also, the voltage of the DC power converted by the converter 11 is reduced by a step-down circuit operation of the charge/discharge chopper 13, and the storage battery 14 is charged. In this way, even when the commercial power supply abnormality occurs, the power can be stably supplied to the inverter 12. With the present embodiment, the charge/discharge chopper 13 has a smaller constant rating than that of the inverter 12. Therefore, it contributes to miniaturize the apparatus.

Figure 10:
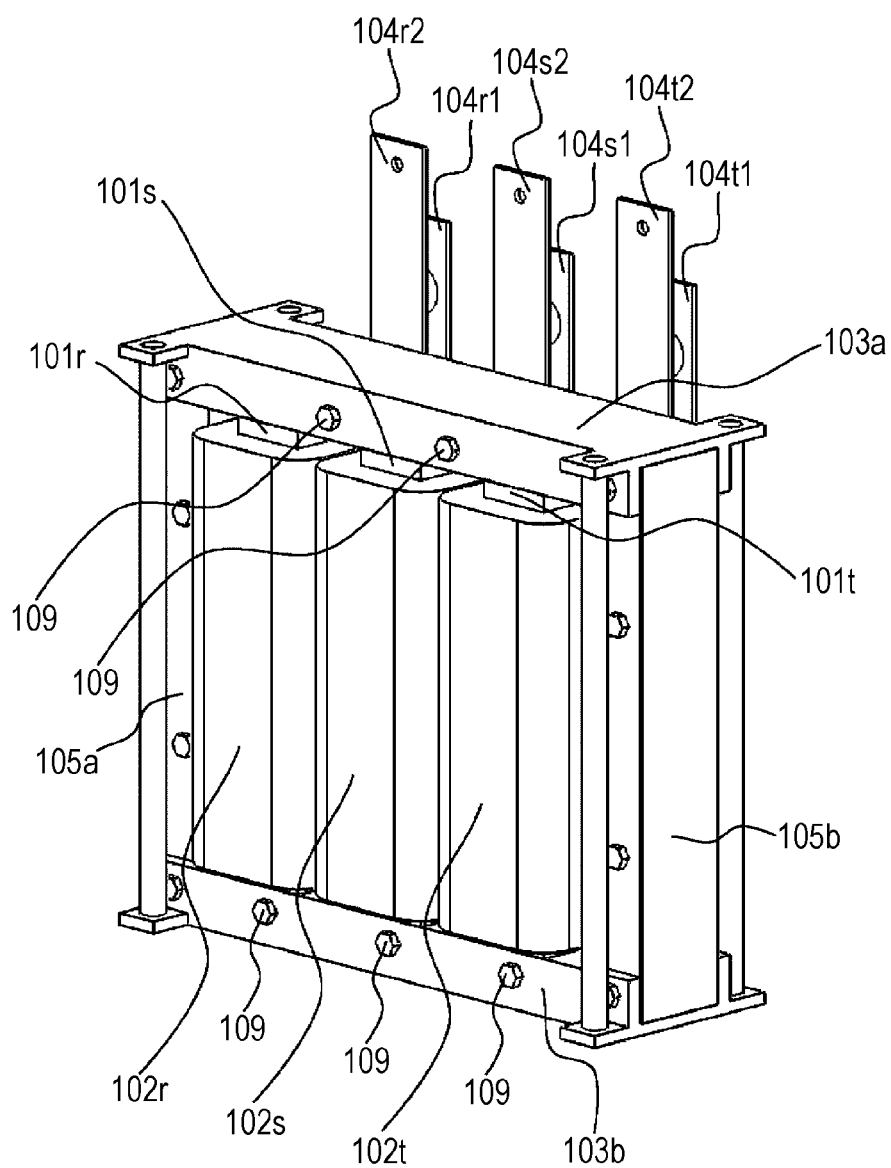
FIG. 10 is a perspective view of three-phase AC reactor 15 having the five-leg iron core included in the UPS 1.

FIG. 10 is a perspective view of the three-phase AC reactor 15 having the five-leg iron core arranged in the previous stage of the converter 11. The three-phase coil is formed by respectively winding coils 102r, 102s, and 102t around magnetic leg iron cores 101r, 101s, and 101t. In addition, the three-phase AC reactor 15 includes zero-phase magnetic leg iron cores 105a and 105b adjacent to the magnetic leg iron cores 101r and 101t, and all the magnetic leg iron cores are joined to yoke iron cores 103a and 103b.

Figure 17:
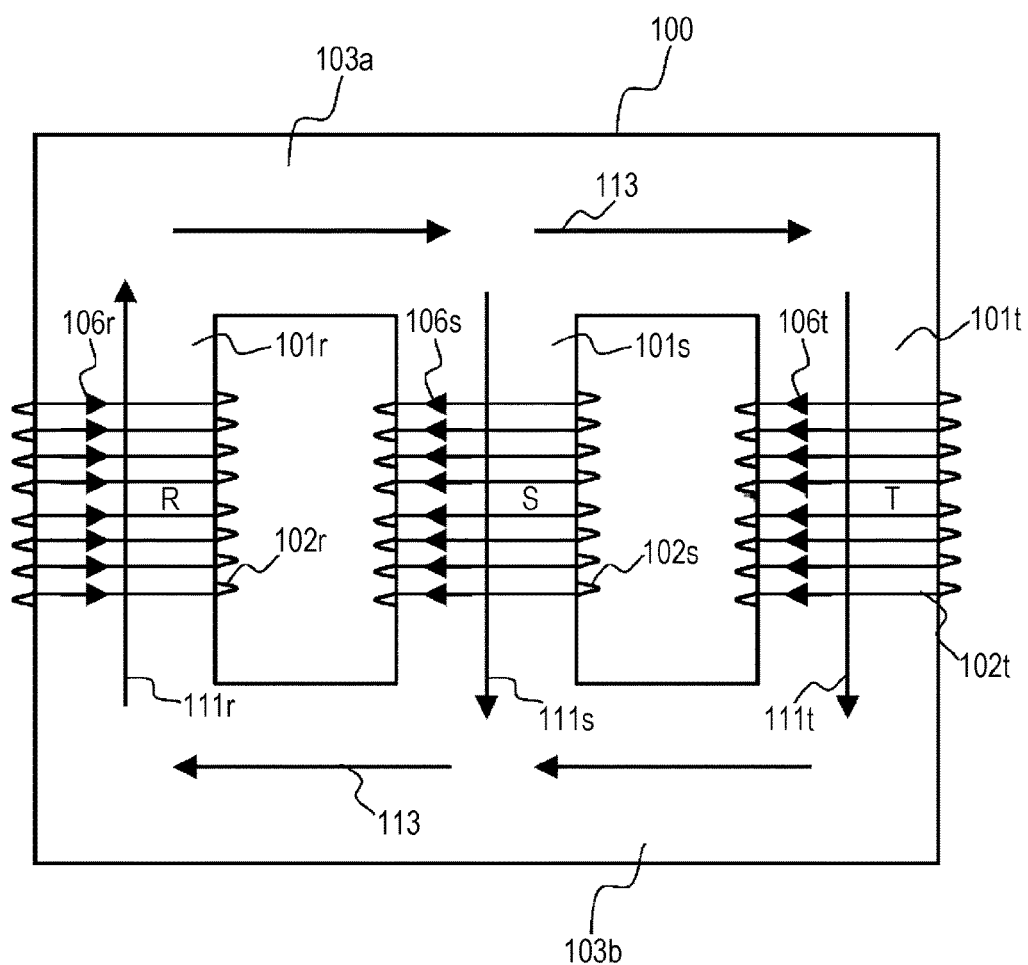
FIG. 17 is an instantaneous magnetic circuit diagram of a three-phase AC reactor 100 having a three-leg iron core when a commercial power supply is normally operated.

Before describing a structure having characteristics of the present embodiment, a three-phase AC reactor formed as a three-leg iron core will be described as an example which is a reference example and is in contrast to the present embodiment. In a schematic structural diagram of the three-phase AC reactor having the three-leg iron core illustrated in FIG. 17, the three-phase coil is formed by respectively winding the coils 102r, 102s, and 102t around the magnetic leg iron cores 101r, 101s, and 101t. The magnetic leg iron core is formed by laminating thin magnetic materials. Each magnetic leg iron core is joined to the yoke iron cores 103a and 103b. When the commercial power supply is normally operated, an R-phase magnetic flux is generated in a direction indicated by a magnetic flux 111r relative to 106r according to the Ampere's right-handed screw law teaches in a case where an R-phase current, flows to a direction of 106r by an R-phase AC voltage. Next, the magnetic flux 111r passes through the yoke iron core 103a and flows into S-phase and T-phase magnetic legs. The directions of the magnetic flux of the magnetic fluxes 111s and 1ilt generated in the S-phase and T-phase is determined according to current directions 106s and 106t, and the magnetic fluxes 111s and 1ilt flow into the R-phase via the yoke iron core 103b. Since the magnetic circuit is closed in the state of FIG. 17, the magnetic flux does not leak.

Figure 18:
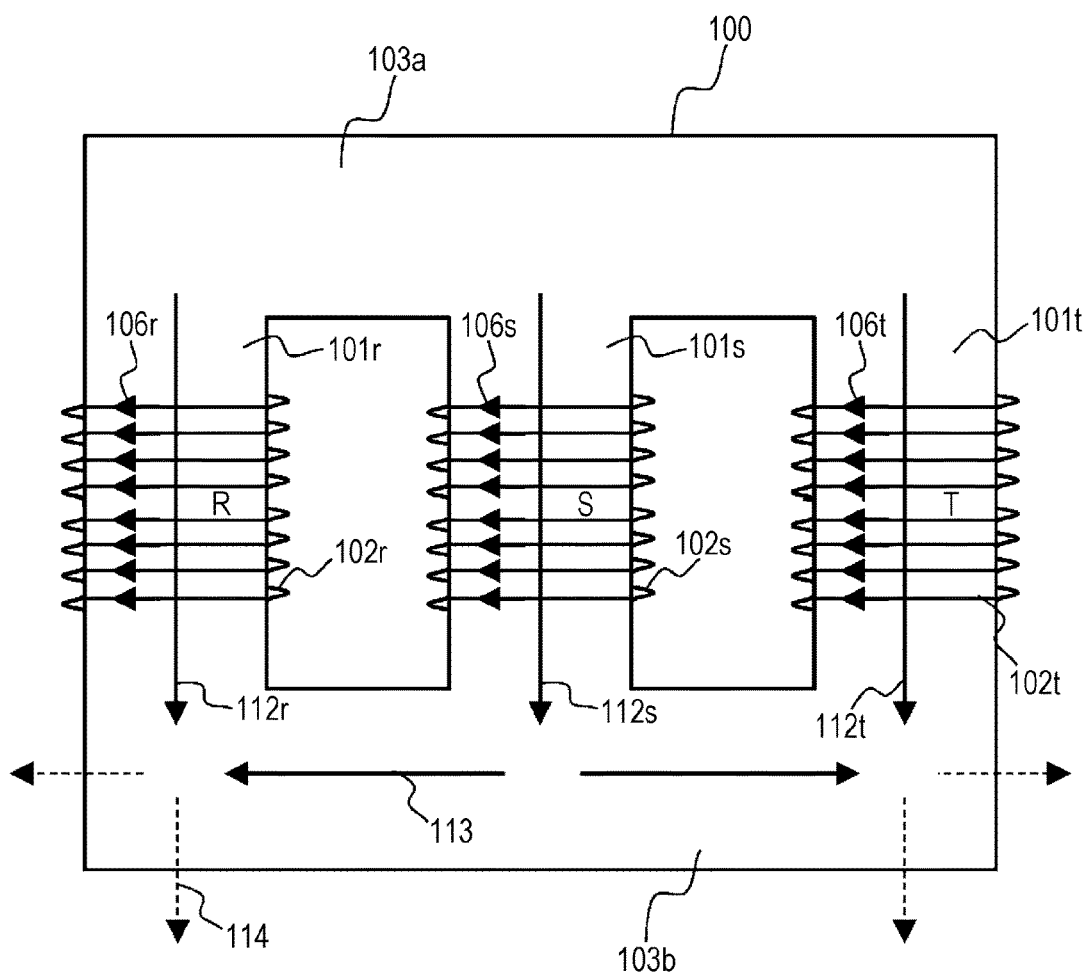
FIG. 18 is a magnetic circuit diagram of the three-phase AC reactor 100 having the three-leg iron core when a commercial power supply abnormality occurs.

The instantaneous magnetic circuit of a case where the DC voltage is applied to the three phases of the three-phase AC reactor having the three-leg iron core is illustrated in FIG. 18. Magnetic fluxes 112r, 112s, and 112t generated by DC energizing in each phase are concentrated to the yoke iron core on one side (lower yoke iron core 103b in FIG. 18) according to the directions of the currents 106r, 106s, and 106t. Since there is no adequate magnetic path, the magnetic fluxes become a leakage, magnetic flux 114 and form a magnetic circuit outside the structure. The leakage magnetic flux 114 becomes a noise, and there is a possibility that this causes a malfunction of the control apparatus of the UPS. Therefore, regarding the three-phase AC reactor in the previous stage of the converter, it is necessary to select a reactor in the previous stage of the converter so as not to generate the leakage magnetic flux in the magnetic circuit formed by the three-phase AC of a case where the commercial power supply is normally operated and in the magnetic circuit formed by storage battery discharge at the time of the abnormality.

Figure 11:
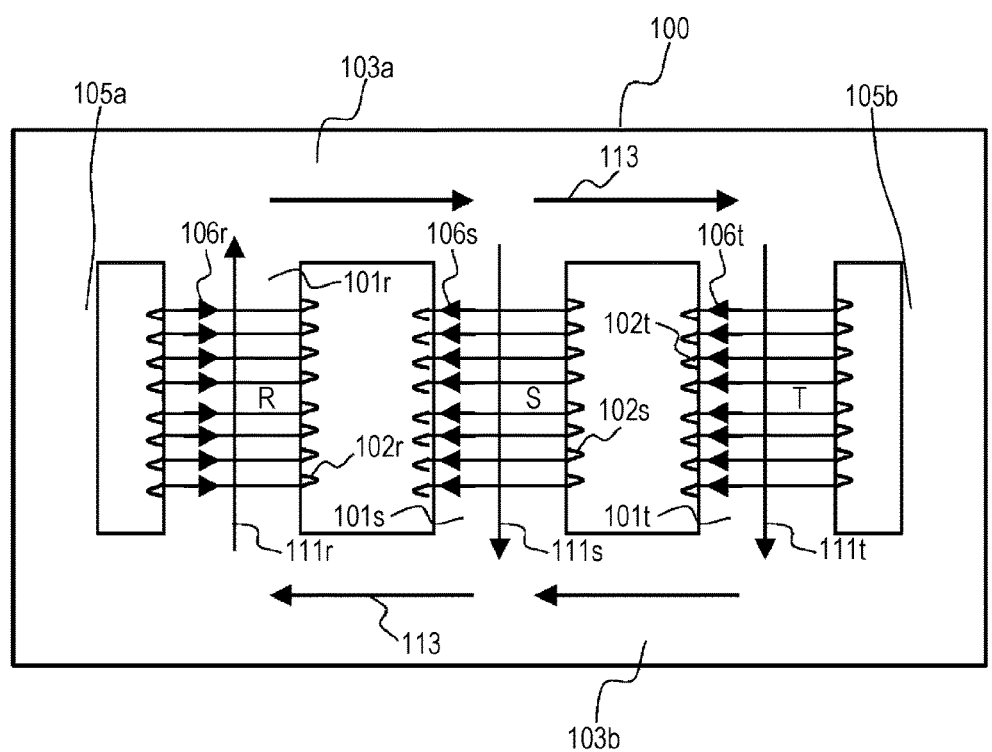
FIG. 11 is an instantaneous magnetic circuit diagram of the three-phase AC reactor 15 having the five-leg iron core included in the UPS 1 when the commercial power supply is normally operated.

Next, as a five-leg iron core which is a characteristic of the present embodiment, FIG. 11 is an instantaneous magnetic circuit diagram of the three-phase AC reactor 15 having the five-leg iron core in a case where the commercial power supply is normally operated. The R-phase magnetic flux is generated in a direction indicated by the magnetic flux 111r relative to 106r according to the Ampere's right-handed screw law teaches in a case where the R-phase current flows to a direction of 106r by the R-phase AC voltage. Next, the magnetic flux 111r passes through the yoke iron core 103a and flows into the S-phase and T-phase magnetic legs. The directions of the magnetic fluxes 111s and 1ilt generated in the S-phase and T-phase is determined according to current directions 106s and 106t, and the magnetic fluxes 111s and 1ilt flow into the R-phase via the yoke iron core 103b. Since the magnetic circuit is closed in the state of FIG. 11, the magnetic flux does not leak.

Figure 12:
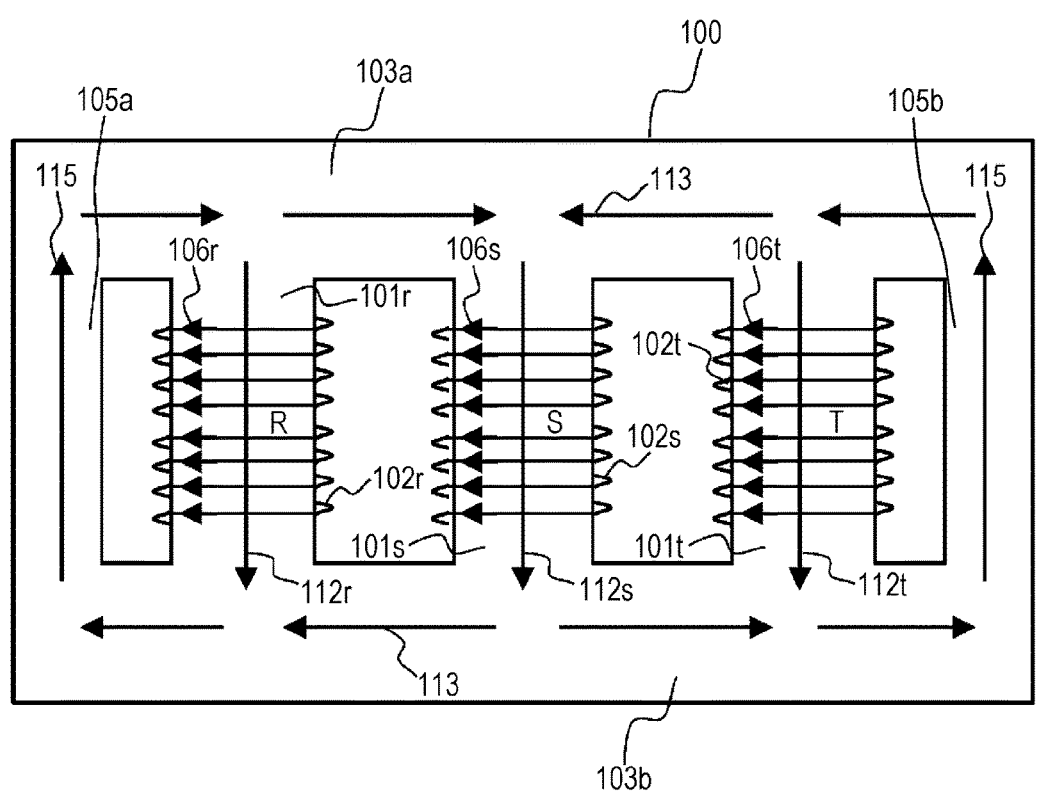
FIG. 12 is a magnetic circuit diagram of the three-phase AC reactor 15 having the five-leg iron core included in the UPS 1 when the commercial power supply abnormality occurs.

On the other hand, FIG. 12 is a magnetic circuit diagram of a case where the DC voltage is applied to all the three phases of the three-phase AC reactor 15 having the five-leg iron core at the time of the abnormality. The magnetic fluxes 112r, 112s, and 112t generated by DC energizing in each phase are concentrated to the yoke iron core on one side (lower yoke iron core 103b in FIG. 12) according to the directions of the currents 106r, 106s, and 106t. The concentrated magnetic fluxes are branched into zero-phase magnetic leg iron cores 105a and 105b via the lower yoke iron core 103b. Then, the magnetic fluxes flow to the upper yoke iron core 103a and flow into the magnetic leg iron cores 101r, 101s, and 101t. Therefore, in a case of the three-phase AC reactor 15 having the five-leg iron core, the magnetic flux leak does not occur even when the DC voltage is applied to all the three phases.

Second Embodiment

Figure 13:
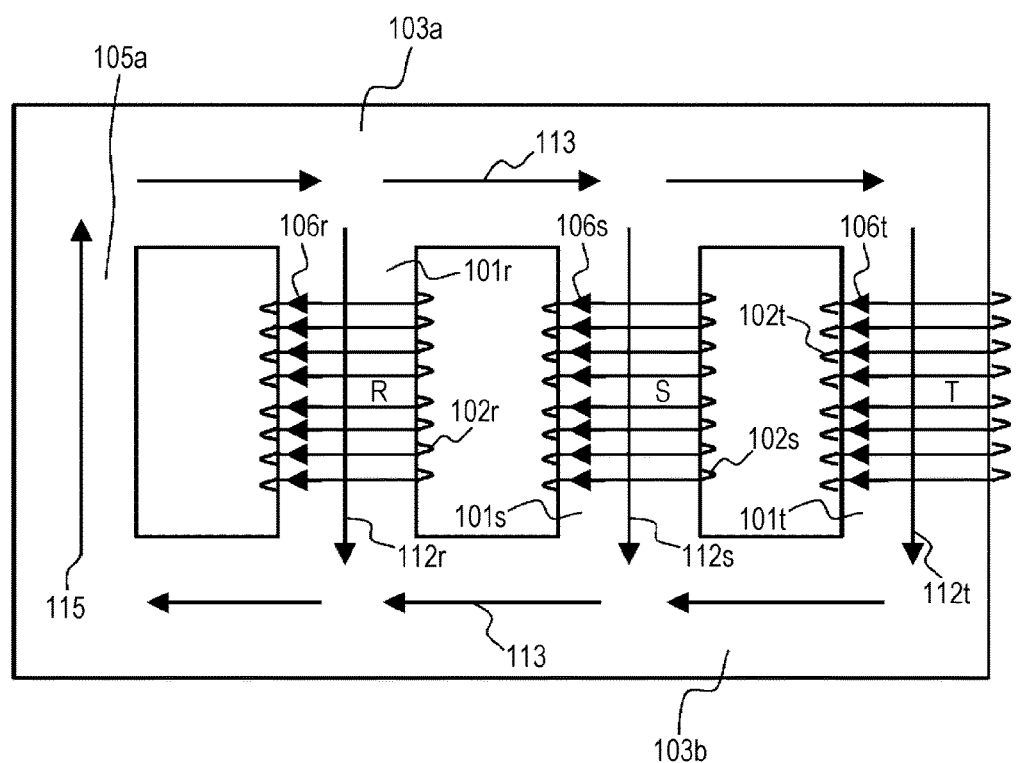
FIG. 13 is a magnetic circuit diagram of a case where a three-phase AC reactor having a four-leg iron core according to a second embodiment is applied to an UPS 1 when a commercial power supply abnormality occurs.

A second embodiment of the present invention will be described with reference to FIG. 13. FIG. 13 is a magnetic circuit diagram of a case where a DC voltage is applied to all the three phases of a three-phase AC reactor having a four-leg iron core. In this way, even when the three-phase AC reactor having the four-leg iron core is arranged in a previous stage of the converter 11, a magnetic circuit is closed. Therefore, an UPS similar to that of the first embodiment can be configured.

Third Embodiment

Figure 14:
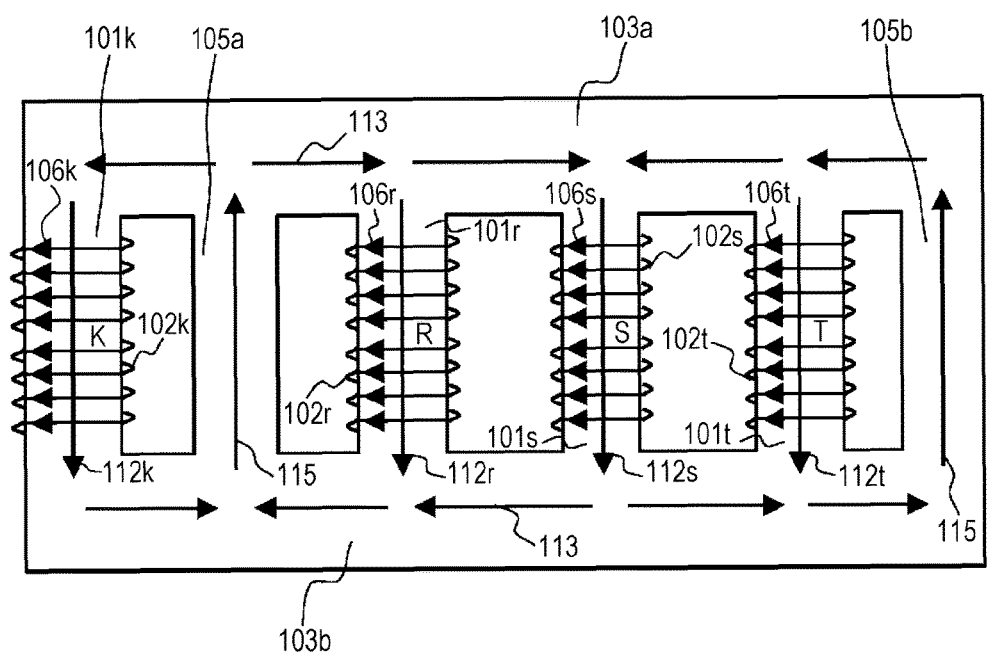
FIG. 14 is a magnetic circuit diagram of a case where a reactor having a six-leg iron core according to a third embodiment is applied to an UPS 1 when a commercial power supply abnormality occurs.

Next, a third embodiment of the present invention will be described with reference to FIG. 14. A three-phase AC reactor 15 having a five-leg iron core in a previous stage of a converter 11 and a reactor 16 in a previous stage of a charge/discharge chopper 13 can be integrated into a single reactor. FIG. 14 is a magnetic circuit diagram of the reactor having the six-leg iron core at the time of commercial power supply abnormality. An output end of a three-phase coil is connected to the converter 11. The three-phase coil is formed by respectively winding coils 102r, 102s, and 102t around magnetic leg iron cores 101r, 101s, and 101t. In addition, an output end of the coil formed by winging a coil 102k around a magnetic leg iron core 101k is connected to the charge/discharge chopper 13. Magnetic leg iron cores 105a and 105b which do not have the coils winding around them are included as a zero-phase magnetic leg iron core, and all the magnetic leg iron cores are joined to yoke iron cores 103a and 103b. At the time of the commercial power supply abnormality, a zero-phase magnetic leg is used as a magnetic path for a magnetic flux 113 concentrated in the yoke iron core. In this way, even when the three-phase AC reactor 15 having the five-leg iron core and the reactor 16 are integrated in a single reactor and the reactor having the six-leg iron core is arranged, the UPS similar to that of the first embodiment can be configured.

Fourth Embodiment

Figure 15:
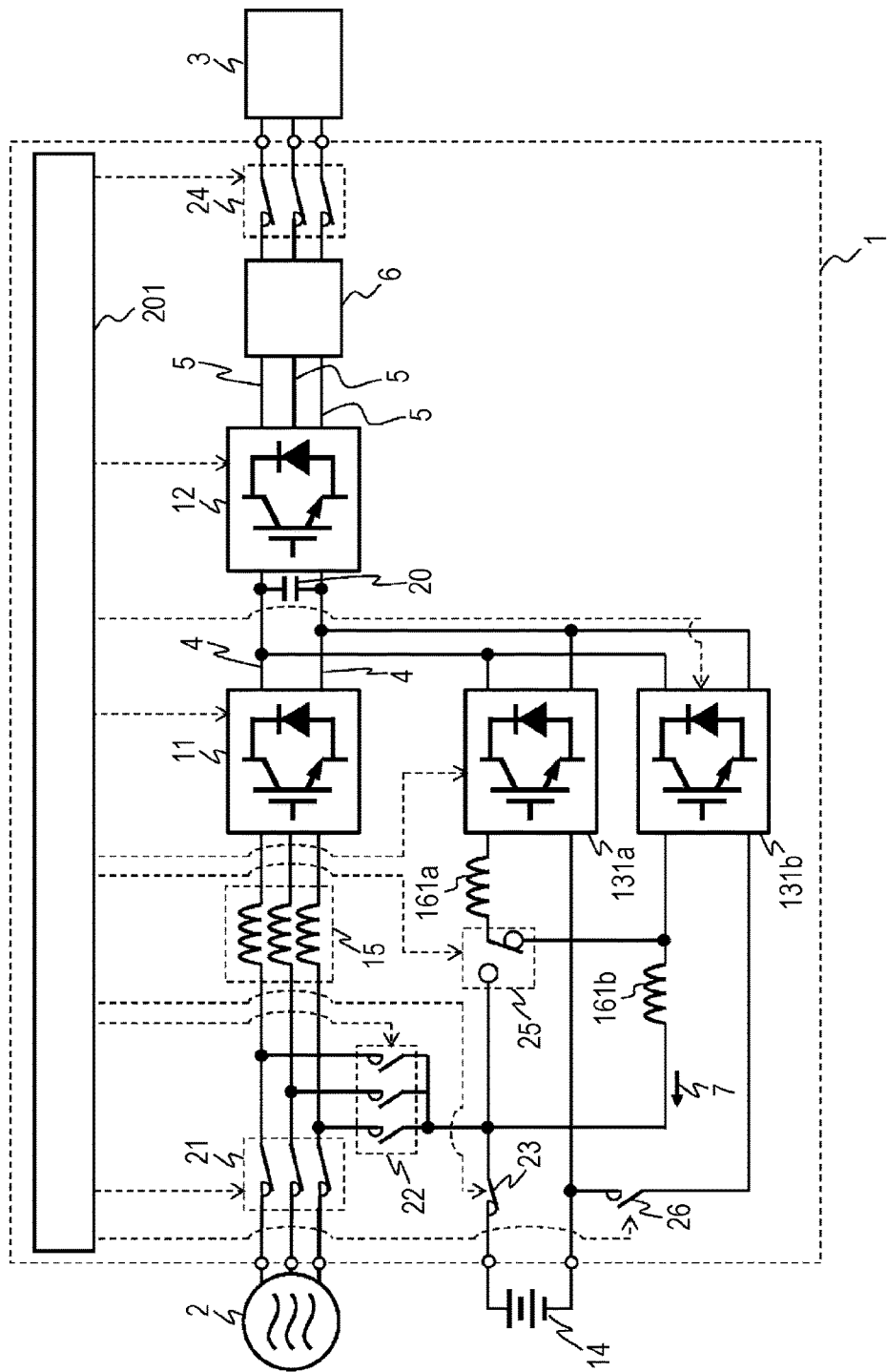
FIG. 15 is a simple circuit diagram of an UPS 1 when a commercial power supply is normally operated in a case where two charge/discharge choppers according to a fourth embodiment are connected in parallel.

A fourth embodiment of the present invention will be described with reference to FIG. 15. FIG. 15 is a simple circuit diagram of an UPS 1 when a commercial power supply is normally operated in an embodiment in which two charge/discharge choppers are connected in parallel. Reactors 161a and 161b are respectively arranged in the previous stages of the choppers 131a and 131b which are divided from the charge/discharge chopper 13 in FIG. 7 and connected in parallel. When a storage battery is charged, a DC voltage 4 rectified by a converter 11 is reduced by the chopper 131a and applied to the reactor 161a. At this time, switching elements 31 and 32 of the chopper 131b are turned OFF, and gates of the switching elements 31 and 32 are closed. At the time of a normal operation, a changeover switch 25 is operated so that the reactors 161a and 161b are connected in series. Therefore, electromagnetic energy emitted from the reactor 161a flows into the reactor 161b, and the energy accumulated in the reactor 161b is supplied to a storage battery 14. In the present embodiment, a discharging switch 26 is turned OFF to reduce the DC voltage 4 by the chopper 131a. At the time of the storage battery discharge, the discharging switch 26 is turned ON, and at the same time, the changeover switch 25 is switched so that the reactors 161a and 161b are connected in parallel. A discharge current flows into the three phases of the converter 11 and the choppers 131a and 131b. The operations of the choppers 131a and 131b and ON/OFF of the changeover switch 25 and the discharging switch 26 are controlled by a signal from a host control circuit 201. With this circuit structure, an inductance can be changed according to current paths at the time of charge and discharge. Also, as the reactor illustrated in FIG. 14, a three-phase AC reactor 15 having a five-leg iron core and the reactors 161a and 161b can be integrated in a single reactor.

Fifth Embodiment

Figure 16:
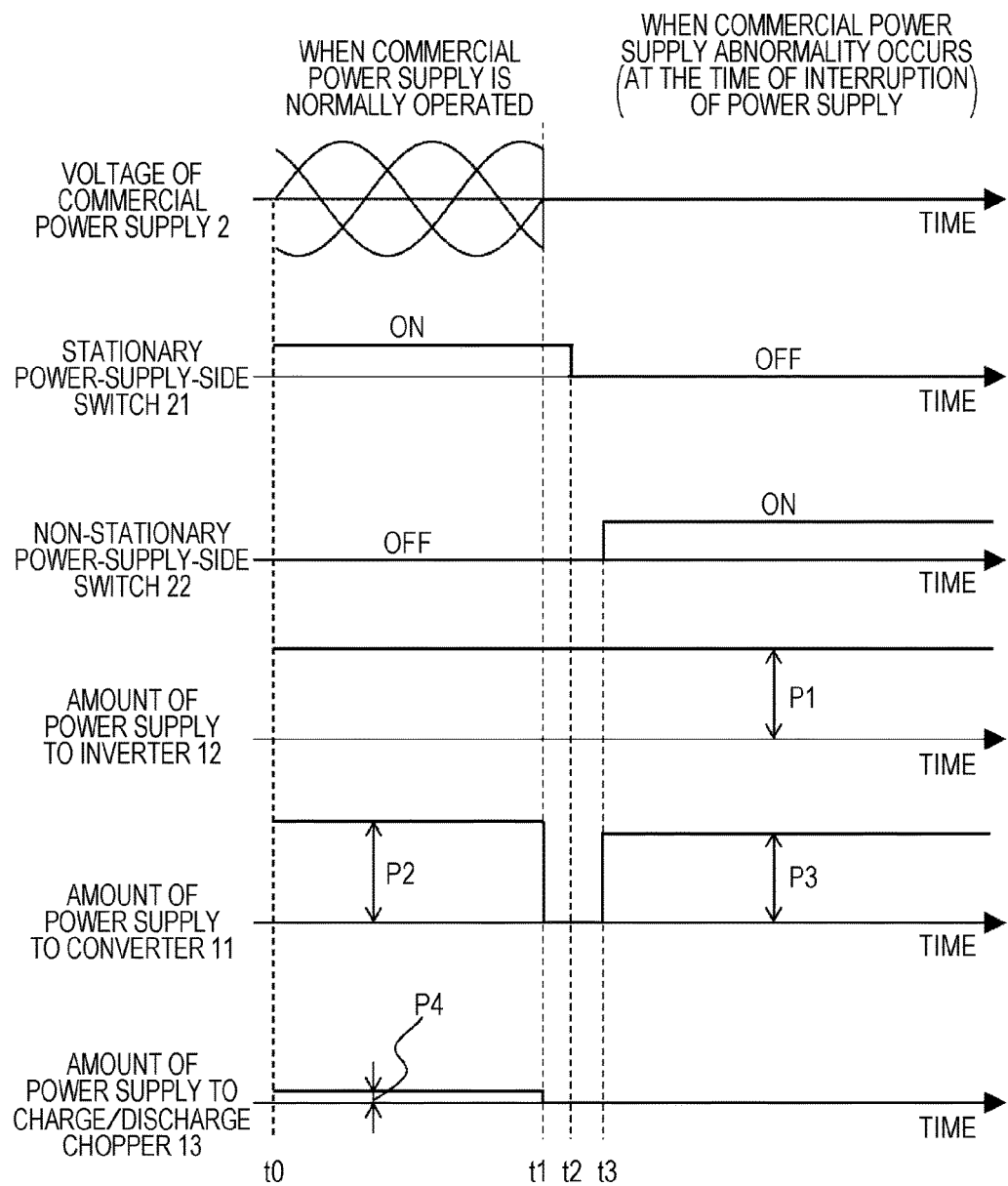
FIG. 16 is a waveform diagram of status of a commercial power supply voltage, switches 21 and 22, a converter 11, an inverter 12, and a charge/discharge chopper 13 according to a fifth embodiment.

A fifth embodiment of the present invention will be described with reference to FIG. 16. FIG. 16 is a waveform diagram of a commercial power supply voltage, switches 21 and 22, a converter 11, a inverter 12, and a charge/discharge chopper 13. Time of t0 to t1 in FIG. 16 indicates a time when the commercial power supply is normally operated, and the time t1 and after the time t1 indicate a time when the commercial power supply abnormality occurs. In the present embodiment, between the times t1 and t3, energy accumulated in a capacitor 20 at the time of a normal operation is supplied to an inverter 12 as a power supply. Accordingly, it is preferable for a charge/discharge chopper 13 to include a charging function of a storage battery 14. Therefore, a circuit structure of the charge/discharge chopper 13 is simplified from a bidirectional chopper to the step-down chopper. That is, the converter 11 has a role for discharging the storage battery at the time of the commercial power supply abnormality. At and after the time t3 when a non-stationary power-supply-side switch 22 is turned ON, the converter 11 is operated as a boosting circuit, and the boosted DC power is supplied to the inverter 12. The relationship between the amounts of the power supply at this time is P1=P3. In the present embodiment, the number of the two-level half bridge circuits 35 of the charge/discharge chopper 13 connected in parallel can be determined according to the charging power 7. Therefore, the apparatus can be further miniaturized.

What is claimed is:

1. An uninterruptible power-supply system comprising:
a converter configured to receive a power from a three-phase AC power supply via a three-phase AC reactor and supply the power to a DC terminal by converting the power into a DC power;
a capacitor configured to smooth a DC voltage supplied to the DC terminal;
an inverter configured to convert the smoothed DC voltage into an AC voltage and supply the power to a load; and
a charge/discharge chopper configured to reduce a voltage of the DC terminal and charge the voltage of the DC terminal to a storage battery or boost a voltage of the storage battery and discharge the voltage of the storage battery to the DC terminal,
wherein when the three-phase AC power supply is in an abnormal state, the power from the storage battery is boosted by the charge/discharge chopper and supplied to the DC terminal, and the power from the storage battery is boosted by the converter and supplied to the DC terminal,
wherein the three-phase AC reactor includes three iron cores having three winding wires corresponding to the three phases and winding around them, a yoke iron core on one side connected to the three iron cores at one side, a yoke iron core on another side connected to the three iron cores on the another side, and a fourth iron core for connecting the yoke iron core on one side with each three iron cores, and
wherein the uninterruptible power supply further comprises:
a switching unit configured to supply the power of the storage battery to the converter; and
a control apparatus configured to limit a discharging power of the chopper equal to or less than the constant rating of the chopper after switching, wherein
the chopper supplies the rated power of the inverter to the inverter during a switching time of the switching unit.

2. The uninterruptible power-supply system according to claim 1, wherein
the fourth iron core connects the yoke iron core on one side with the yoke iron core on the another side.

3. The uninterruptible power-supply system according to claim 2, comprising:
a fifth iron core configured to connect the yoke iron core on one side with the yoke iron core on the another side.

4. The uninterruptible power-supply system according to claim 1, wherein
the three iron cores have magnetic fluxes for flowing to the same direction when the three-phase AC power supply is in the abnormal state.

5. The uninterruptible power-supply system according to claim 1, wherein
the charge/discharge chopper includes a smaller constant rating than that of the inverter.

6. The uninterruptible power-supply system according to claim 1, wherein
two or more charge/discharge choppers are connected in parallel,
the charge/discharge chopper includes a single-phase reactor connected to each previous stage of the chopper and a switching unit for changing a current path between the time of the charge/discharge the storage battery provided therein and changes an inductance of the current path between the time of the charging and discharging.

7. The uninterruptible power-supply system according to claim 1, wherein
the three-phase AC reactor in the previous stage of the converter and a single-phase reactor in the previous stage of the charge/discharge chopper are integrated into a single reactor, and
the reactor has four magnetic leg iron cores having coils winding around them and at least one leg which does not have a coil winding around it, and the four magnetic leg iron cores and at least one leg are connected in parallel (for example, six-leg iron core).

8. An uninterruptible power-supply system comprising:
a converter configured to receive power from a three-phase AC power supply via a three-phase AC reactor and supply the power to a DC terminal by converting the power into a DC power;
a capacitor configured to smooth a DC voltage supplied to the DC terminal;
an inverter configured to convert the smoothed DC voltage into an AC voltage and supply the power to a load; and
a charge/discharge chopper configured to reduce a voltage of the DC terminal and charge the voltage of the DC terminal to a storage battery or boost a voltage of the storage battery and discharge the voltage of the storage battery to the DC terminal,
wherein when the three-phase AC power supply is in an abnormal state, the power from the storage battery is boosted by the charge/discharge chopper and supplied to the DC terminal, and the power from the storage battery is boosted by the converter and supplied to the DC terminal,
wherein the three-phase AC reactor includes three iron cores having three winding wires corresponding to the three phases and winding around them, a yoke iron core on one side connected to the three iron cores at one side, a yoke iron core on another side connected to the three iron cores on the another side, and a fourth iron core for connecting the yoke iron core on one side with each three iron cores, and
wherein the uninterruptible power-supply system, further comprises:
a switching unit configured to supply the power of the storage battery to the converter, wherein
the capacitor supplies a rated power of the inverter to the inverter during a switching time of the switching unit, and
a constant rating of the charge/discharge chopper is determined according to the power to charge the storage battery.

* * * * *